(12) United States Patent
Banerjee et al.

(10) Patent No.: US 12,019,535 B2
(45) Date of Patent: Jun. 25, 2024

(54) IDENTIFICATION OF PROGRAM PATH PROFILE FOR PROGRAM OPTIMIZATION

(71) Applicant: International Business Machines Corporation, Armonk, NY (US)

(72) Inventors: Subhasis Banerjee, Bangalore (IN); Pidad Gasfar D'Souza, Bengaluru (IN); Himanshu Shrivastava, Vidisha (IN); Aditya Abhay Nitsure, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/533,388

(22) Filed: Nov. 23, 2021

(65) Prior Publication Data

US 2023/0161684 A1     May 25, 2023

(51) Int. Cl.
    *G06F 11/36*     (2006.01)
(52) U.S. Cl.
    CPC ................. *G06F 11/3636* (2013.01)
(58) Field of Classification Search
    CPC .................................................. G06F 11/3636
    See application file for complete search history.

(56) References Cited

U.S. PATENT DOCUMENTS

| | | | | |
|---|---|---|---|---|
| 6,070,009 | A * | 5/2000 | Dean | G06F 11/3466 717/130 |
| 6,170,083 | B1 * | 1/2001 | Adl-Tabatabai | G06F 8/443 717/145 |
| 6,848,100 | B1 | 1/2005 | Wu et al. | |
| 6,934,935 | B1 | 8/2005 | Bennett et al. | |
| 2006/0242636 | A1 * | 10/2006 | Chilimbi | G06F 11/3612 717/158 |
| 2008/0172549 | A1 * | 7/2008 | Caprioli | G06F 9/30189 712/216 |
| 2008/0301502 | A1 * | 12/2008 | Harsha | G06F 11/366 714/37 |
| 2012/0227045 | A1 * | 9/2012 | Knauth | G06F 9/30101 718/100 |
| 2013/0055033 | A1 * | 2/2013 | Frazier | G06F 11/348 714/45 |

(Continued)

OTHER PUBLICATIONS

Ball, T., et al., "Efficient Path Profiling", Proceedings of MICRO-29, Dec. 2-4, 1996, 13 pages.

(Continued)

*Primary Examiner* — S. Sough
*Assistant Examiner* — Stephen D Berman
(74) *Attorney, Agent, or Firm* — Scully, Scott, Murphy & Presser, P.C.; Nicholas Welling

(57) ABSTRACT

Methods and systems for tracking events in a computer program are described. A processor including one or more execution units can be configured to execute instructions of a computer program. An instrumentation tool coupled to the processor can be configured to instrument the computer program to track a program path of the computer program. The program path can include one or more instruction sequence blocks. Each instruction sequence block can include a sequence of instructions having a single entry point and a single exit point. The instrumentation tool can be further configured to track occurrences of one or more events experienced by the program path.

17 Claims, 7 Drawing Sheets

(56) References Cited

U.S. PATENT DOCUMENTS

| | | | | |
|---|---|---|---|---|
| 2014/0082329 | A1* | 3/2014 | Ghose | G06F 21/566 712/208 |
| 2017/0344349 | A1* | 11/2017 | He | G06F 8/443 |
| 2018/0173291 | A1* | 6/2018 | Levit-Gurevich | G06F 1/3206 |
| 2020/0089503 | A1 | 3/2020 | Gupta et al. | |
| 2020/0210193 | A1 | 7/2020 | Bhattacharya et al. | |

OTHER PUBLICATIONS

Ammons, G., et al., "Exploiting Hardware Performance Counters with Context Sensitive Profiling", 1997 ACM SIGPLAN Conference on Programming Languages Design and Implementation, Jun. 15-18, 1997, 12 pages.

Merten, M.C., et al., "A Hardware-Driven Profiling Scheme for Identifying Program Hot Spots to Support Runtime Optimization", Proceedings of the 26th Annual International Symposium on Computer Architecture (ISCA), May 1999, 12 pages.

Vaswani, K., et al., "A Programmable Hardware Path Profiler", International Symposium on Code Generation and Optimization 2005, (CGO '05), Apr. 2005, 13 pages.

Shye, A., et al., "Analysis of Path Profiling Information Generated with Performance Monitoring Hardware", 9th Annual Workshop on Interaction between Compilers and Computer Architectures 2005 (INTERACT'05), 10 pages.

Ball, T., et al., "Edge profiling versus Path Profiling: The Showdown", POPL 98, 1998, pp. 134-148.

Chouhan, R., et al., "Pertinent Path Profiling: Tracking Interactions Among Relevant Statements", CGO '13, Feb. 23-27, 2013, 12 pages.

Moreira, F.B., et al., "Profiling and Reducing Micro-Architecture Bottlenecks at the Hardware Level", 2014 IEEE 26th International Symposium on Computer Architecture and High Performance Computing, Oct. 22-24, 2014, pp. 222-229.

Moreira, F.B., et al., "A Dynamic Block-Level Execution Profiler", Journal of Parallel Computing, Submitted Nov. 17, 2015, 23 pages.

* cited by examiner

340

IDENTIFICATION OF PROGRAM PATH PROFILE FOR PROGRAM OPTIMIZATION

BACKGROUND

The present invention relates to methods and systems for profiling computer programs. In particular, one aspect of the present invention relates to profiling program paths of a computer program having a specific type of instruction sequence blocks.

In an example, software profiling or program profiling may be a form of dynamic program analysis that measures performance of a program, such as, for example, memory or time complexity, the usage of particular instructions, or the frequency and duration of function calls. Profiling information resulting from program profiling may be used for optimizing the program, or the code of the program. Program profiling may be achieved by instrumenting either the program source code or its binary executable form using a tool, such as a profiler.

SUMMARY

The summary of the disclosure is given to aid understanding of the computer processing systems and methods of program profiling, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the memory systems, architectural structure and method of operation to achieve different effects.

In an embodiment, a method for tracking events in a computer program is generally described. The method can include instrumenting the computer program to track a program path of the computer program. The program path can include one or more instruction sequence blocks. Each instruction sequence block can include a sequence of instructions having a single entry point and a single exit point. The method can further include tracking occurrences of one or more events experienced by the program path.

In one or more embodiments, a system for tracking events in a computer program is generally described. The system can include a processor including one or more execution units configured to execute instructions of a computer program. The system can further include an instrumentation tool coupled to the processor. The instrumentation tool can be configured to instrument the computer program to track a program path of the computer program. The program path can include one or more instruction sequence blocks. Each instruction sequence block can include a sequence of instructions having a single entry point and a single exit point. The instrumentation tool can further track occurrences of one or more events experienced by the program path.

In another embodiment, a computer program product for tracking events in a computer program is generally described. The computer program product can include a non-transitory computer readable storage medium having program instructions embodied therewith. The program instructions can be executable by a processing element to instrument the computer program to track a program path of the computer program. The program path can include one or more instruction sequence blocks. Each instruction sequence block can include a sequence of instructions having a single entry point and a single exit point. The program instructions can be further executable by the processing element to track occurrences of one or more events experienced by the program path.

Further features as well as the structure and operation of various embodiments are described in detail below with reference to the accompanying drawings. In the drawings, like reference numbers indicate identical or functionally similar elements.

DETAILED DESCRIPTION

Figure 1:
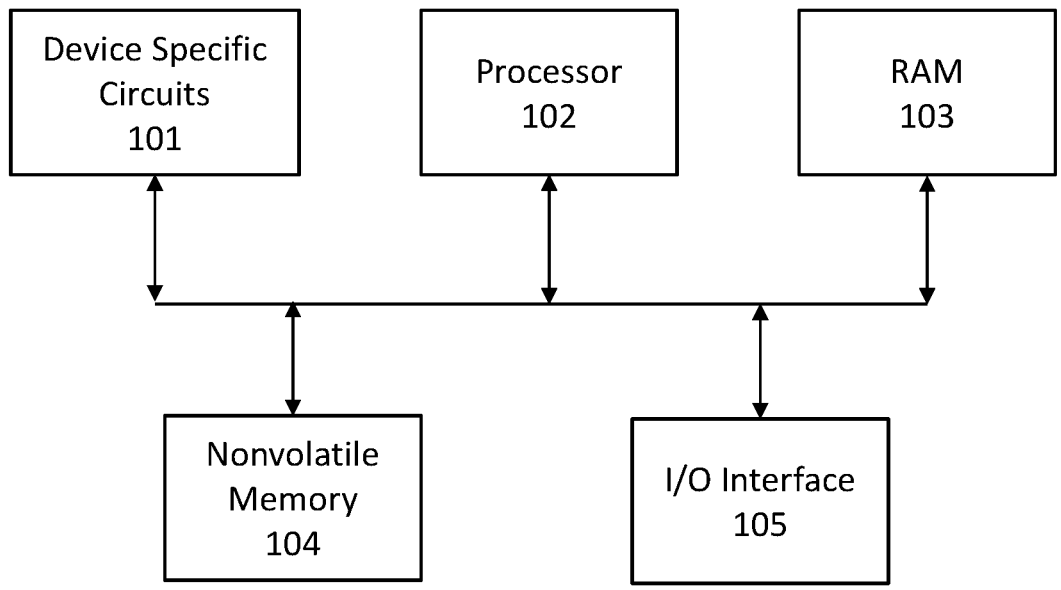
FIG. 1 depicts a general computing or data processing system in accordance with an embodiment.

The following description is made for illustrating the general principles of the invention and is not meant to limit the inventive concepts claimed herein. In the following detailed description, numerous details are set forth in order to provide an understanding of an execution of a computer program, profiling program paths of a computer program or software application, optimizing a computer program, through a processor, its architectural structure, and its method of operation, however, it will be understood by those skilled in the art that different and numerous embodiments of the processor, architectural structure, and method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

In an example, a profiler may instrument a program by inserting code into the source code or executable file of the program in order to record various types of statistical data as the program runs. The inserted code may collect different types of information from the program, and may collect the information under different rules and/or conditions. In an example, point profiling may collect all data in a period of time during execution of the program, combine the collected data, and determine specific metrics from the combined data. For example, point profiling may include determining statistics (e.g., average) of various attributes such as calculation speed, power consumption, memory capacity, of certain events based on the data collected over the period of time, and optimize the program based on the determined statistics. Point profiling may provide information on, for example, frequency of a specific functions, relative frequency, time spent on specific functions, etc. However, point profiling may be unable to provide information relating to sequences of instruction execution. For example, point profiling may not be able to provide information indicating whether a certain sequence of instructions may lead to bottleneck.

To be described in more detail below, the methods and systems described herein may provide program path profiling that focuses on execution or program paths of a program. Program path profiling may provide fine grain information on program path having a specific type of instruction sequence referred to as basic blocks (BB). In one or more embodiments, a BB is a sequence of instructions that has only one entry and one exit point. Further, in an aspect, the program path described in accordance with the present disclosure can be a specific sequence of BB executions determined by the dynamic outcome of branch instructions. The methods and systems described herein can provide microarchitectural support to program path profile with retired instructions along with specific architectural events. The microarchitecture can include a hardware component, such as an integrated circuit (IC) that can generate a compressed program path descriptor (PPD), and a set of buffers that can store PPD augmented with event counters such as, number of cycles, number of cache miss events, etc.

A computing or data processing system 100 suitable for storing and/or executing program code may take many forms and in one embodiment may include at least one processor 102, which may be or be part of a controller, coupled directly or indirectly to memory devices or elements through a system bus, as shown in FIG. 1. Computing system 100 in FIG. 1 is shown with a processor 102, Random Access Memory (RAM) 103, nonvolatile memory 104, device specific circuits 101, and I/O interface 105. Alternatively, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation/Drive Interface (ADI).

Figure 2:
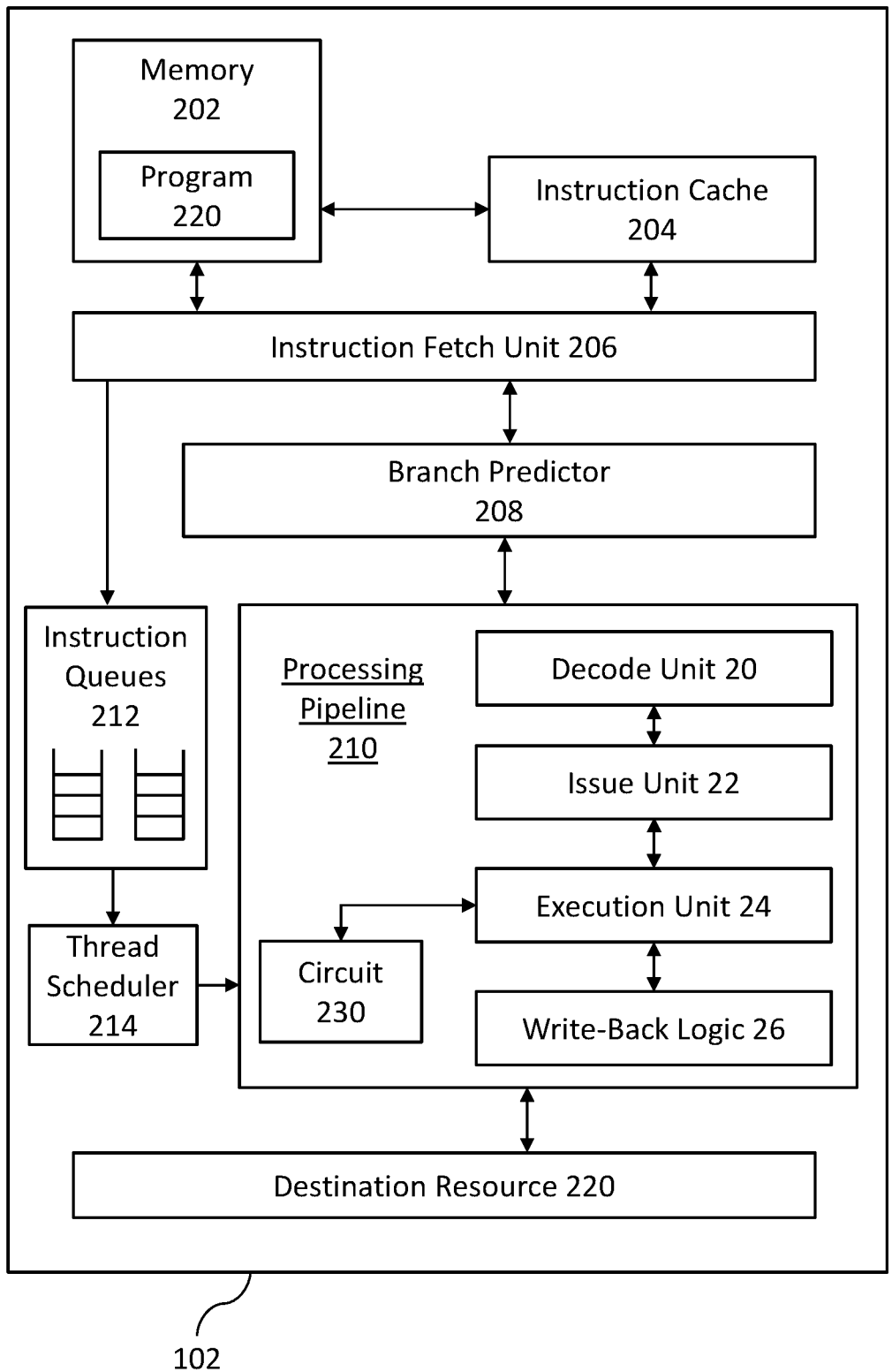
FIG. 2 a block diagram of a processor in accordance with an embodiment

FIG. 2 depicts a block diagram of a processor 102 according to an embodiment. The processor 102 may include at least a memory 202, an instruction cache 204, an instruction fetch unit 206, a branch predictor 208, and a processor pipeline or a processing pipeline 210. The processor 102 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. A data cache (not depicted) may also be included in the processor 102. In one embodiment, instruction cache 204 may be configured to provide instructions in an 8-way set associative structure. Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 102 may include multiple processing pipelines 210 and instruction fetch units 206. In an embodiment, the processing pipeline 210 includes a decode unit 20, an issue unit 22, an execution unit 24, and write-back logic 26. In some examples, the instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 102 is depicted in FIG. 2, other feedback and signaling paths may be included between elements of the processor 102.

Branch instructions (or "branch") can be either unconditional, meaning that the branch is taken every time that the instruction is encountered in the program, or conditional, meaning that the branch is either taken or not taken, depending upon a condition. The processor 102 can provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. The branch predictor 208 can attempt to predict the outcome of conditional branch instructions in a program before the branch instruction is executed. If a branch is mispredicted, all of the speculative work, beyond the point in the program where the branch is encountered, must be discarded. For example, when a conditional branch instruction is encountered, the processor 102 may predict which instruction will be executed after the outcome of the branch condition is known. Then, instead of stalling the processing pipeline 210 when the conditional branch instruction is issued, the processor may continue issuing instructions beginning with the predicted next instruction.

In a conditional branch, control can be transferred to the target address depending upon the results of a previous instruction. Conditional branches may be either resolved or unresolved branches depending on whether the result of the previous instruction is known at the time of the execution of the branch. If the branch is resolved, then it is known whether the branch is to be executed. If the conditional branch is not executed, the next sequential instruction stream immediately following the branch instruction is executed. If the conditional branch is executed, then the instruction stream starting at the target address is executed.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units in the execution unit 24 based on the analysis. The execution unit 24 executes the instructions and determines if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch can be discarded from the various units of processor 102. The execution unit 24 may include a plurality of execution units, such as fixed-point execution units, floating-point execution units, load/store execution units, and vector multimedia execution units. The execution unit 24 may also include specialized branch predictors to predict the target of a multi-target branch. The write-back logic 26 writes results of instruction execution back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

In an embodiment, processor 102 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 24, decode unit 20, reorder buffer, etc. to determine if the predicted branch direction is correct or incorrect.

To facilitate multithreading, instructions from different threads can be interleaved in some fashion at some point in the overall processor pipeline. An example technique to interleave instructions from different threads involves interleaving instructions on a cycle-by-cycle basis based on interleaving rules. For example, instructions from the different threads can be interleaved such that a processor can perform an instruction from a first thread in a first clock cycle, and then an instruction from a second thread in a second clock cycle, and subsequently another instruction from the first thread in a third clock cycle and so forth. Some interleaving techniques may involve assigning a priority to each thread and then interleaving instructions from the different threads based on the assigned priorities. For example, if a first thread is assigned to a higher priority than a second thread, an interleaving rule may require that twice as many instructions from the first thread assigned with the higher priority be included in the interleaved stream as compared to instructions from the second thread assigned with the lower priority. Various different interleaving rules can be set, such as rules designed for resolving threads with the same priority, or rules that interleave instructions from relatively less important threads periodically (e.g., performing instruction from a lower priority thread every X cycles).

Thread interleaving based on priorities can allow processor resources to be allotted based on the assigned priorities. However, thread priorities sometimes do not take into account processor events, such as branch mispredictions, that may affect the ability of threads to advance through a processor pipeline. These events can sometimes impact the efficiency of processor resources allotted between different instruction threads in a multi-thread processor. For example, priority-based techniques that give higher priority to threads with fewer instructions in the decode, rename, and instruction queue stages of the pipeline sometimes can be inefficient at reducing the number of wrong-path instructions caused by branch mispredictions (e.g., incorrectly speculated instructions) in the pipeline. These wrong-path instructions can tie up the fetch bandwidth and other valuable resources of the processor, such as instruction queues and other functional units.

Efficiency and/or performance of the processor 102 can be improved by reducing the number of wrong-path instructions in the processing pipeline 210. For example, threads with higher rate of mispredictions can be delayed (e.g., fetched slower by the instruction fetch unit) in the processing pipeline 210, causing a reduction in the number of wrong-path instructions in the processing pipeline 210. Further, a number of instructions following a first unfinished or unresolved branch instruction processing pipeline 210 can be tracked to prevent an excessive number of potentially wrong-path instructions being performed.

In an embodiment, the processor 102 can be a SMT processor configured to perform multithreading. The processor 102 can use one or more instruction queues 212 to collect instructions from the one or more different threads. The instruction fetch unit 206 can fetch instructions stored in the instruction cache 204 and fill the instruction queues 212 with the fetched instructions. Performance of the processor 102 can depend on how the instruction fetch unit 206 fill these instruction queues 212. The instruction fetch unit 206 can be configured to assign and manage priorities of the different threads, and based on these priorities, decide which instructions and/or which threads to fetch and send these fetched instructions to the instruction queues 212. The processor 102 can further include a thread scheduler 214 configured to schedule and distribute the instructions in the instruction queues 212 to the processing pipeline 210.

In one or more embodiments, the processor 102 can be configured to execute a computer program 220 ("program 220") using the processing pipeline 210. Source code and/or executable code of the program 220 can be stored in the memory 202. The processor 102 can include a circuit 230 that can be an integrated circuit (IC) including logic components and storage devices, such as buffers. The circuit 230 can be an instrumentation tool configured to facilitate instrumentation of the program 220. For example, the circuit 230 can instrument the program 220 with code that can implement a program profiling tool. The circuit 230 can provide hardware components (e.g., logic and storage devices) that can run at least some portions of the code implementing the program profiling tool. In an aspect, the circuit 230 can include buffers and counters that can store and track occurrences of specific program paths and/or events at different stages of the processing pipeline 210 during execution of the program 220. The buffers of the circuit 230 may also store identifications (IDs) of the program paths and specific instruction sequence blocks. The circuit 230 can further include components such as comparators and accumulators that can combine, sort, and process, the IDs and values being tracked by the buffers to output data that can be used for optimizing the program 220.

Figure 3A:
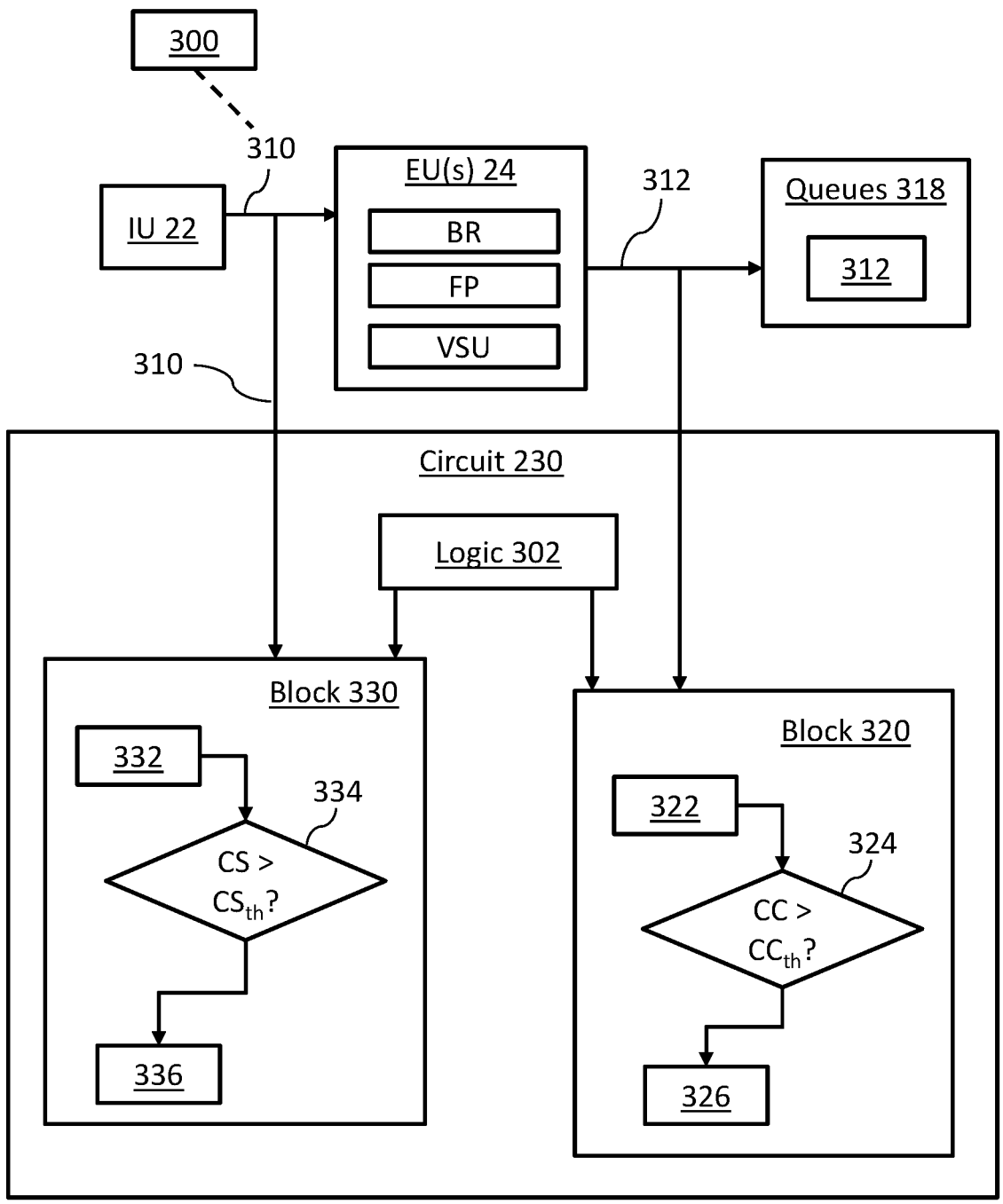
FIG. 3A illustrates an example implementation of identifying a program path profile for program optimization in accordance with an embodiment.

FIG. 3A illustrates an example implementation of identification of program path profile for program optimization in accordance with an embodiment. In an aspect, the circuit 230 can include logic 302, circuit block 320 (or block 320), and circuit block 330 (or block 330). The logic 302 can be an integrated circuit (IC) including logic components and/or electronic components, such as logic gates, field-effect transistors (FET), etc. The block 320 can be connected to outputs of one or more execution units (EU) 24 (see FIG. 2). The execution units 24 can include one or more execution units configured to process different types of instructions. In the example shown in FIG. 3, the execution units 24 can include a branch instruction unit (BR), a fixed point execution unit (FP), and a vector scalar unit (VSU), etc. The block 330 can be connected between an output of the issue unit (IU) 22 and inputs of the execution units 24. The block 320 can include a set of buffers 322, a set of circuit elements 324, and another set of buffers 326. The block 330 can include a set of buffers 332, a set of circuit elements 334, and another set of buffers 336.

In an aspect, the issue unit 22 can issue instructions 310 of a computer program 300 to the execution units 24 and to the block 330. In response to the execution units 24 processing the instructions 310 from the issue unit 22, the processed instructions 312 can be stored in one or more queues 318 as committed instructions. In one or more embodiments, a committed instruction can be an instruction that is processed but cannot be undone, and the committed instruction is only visible to the processing element (e.g., a processor, a processor core, a thread, etc.) that processed the instruction. The processed or committed instructions 312 can be forwarded to the block 320.

The circuit 230 can implement the logic 302 to identify or profile one or more program paths of the computer program 300, where each program path is formed by a sequence of one or more basic blocks (BB). In an aspect, a BB is a smallest section of code having a sequence of instructions, and each basic block has only one entry and one exit point (e.g., one input variable and one output variable). Therefore, instructions having more than one possible outcomes can terminate a BB. For example, a branch instruction can terminate a BB since the branch instruction can have two exit points (e.g., taken or not taken). In an embodiment, the logic 302 can access the program code of the program 300. The logic 302 can identify sequences of instructions having one entry point and one exit point, and form different basic blocks (BBs) using these identified sequences. For example, the logic 302 can identify a sequence of instructions "load, add, store, branch", and create a basic block (BB) having the identified sequence of instructions.

Figure 3B:
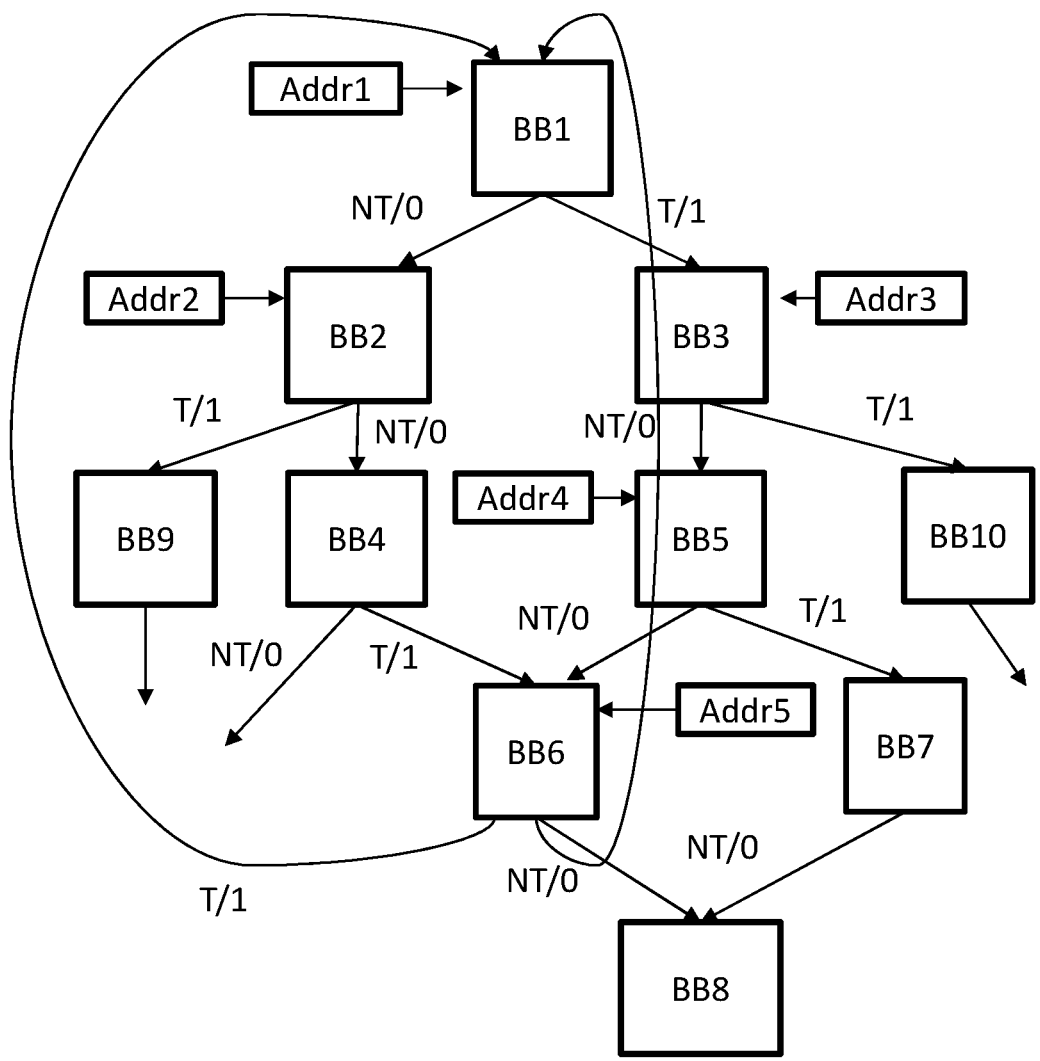
FIG. 3B illustrates an example of determining program path profiles of a computer program in accordance with an embodiment.

In response to forming each basic block, the logic 302 can monitor the outcome of each basic block among the computer program 300 to form program paths. A flow 340 is shown in FIG. 3B, where the flow 340 can be a directed graph including nodes representing basic blocks and edges representing taken or not taken branches. In the flow 340, each basic block can be terminated with a branch instruction that can be taken (labeled as T or binary 1 in FIG. 3B) or not taken (labeled as NT or binary 0 in FIG. 3B). In FIG. 3B, a basic block BB1 will either proceed to another basic block BB2 if the terminating branch of BB1 is not taken, or proceed to another basic block BB3 if the terminating branch of BB1 is taken. Further, each basic block can be associated with a target address. For example, BB1 can be associated with a target address Addr1, where Addr1 can be an address of the terminating branch instruction of BB1. In one or more embodiments, each basic block is uniquely defined by a program counter (PC) address of the first instruction of the basic block. In another embodiment, the PC address can also be mapped from a first location of the code segment in the basic block to a relative location of a starting address of the first instruction of the basic block. Hence, an address of the basic block is an identifier which is unique, and a basic block is identified if its address is given. In the example of FIG. 3B, a program path can be BB1-BB3-BB5-BB6, and another program path can be BB1-BB3-BB5-BB7-BB8. A program path can terminate based on different conditions. In an embodiment, the program path BB1-BB3-BB5-BB6 terminates at BB6 and does not proceed to BB8 because BB6's taken path loops back to the starting basic block BB1. In another embodiment, a program path can terminate based on Ball-Larus Path (B-L path) profiling.

The circuit 230 can implement the logic 302 to generate a unique signature or identification (ID) of each program path. The generated signature or ID of an program path can be referred to as a program path descriptor (PPD). In one embodiment, the logic 302 can assign binary values to the taken and not taken branches, such as binary 1 for taken and binary 0 for not taken. The target address of a starting basic block, and the assigned binary values can be used for generating an ID for a program path. For example, the program path BB1-BB3-BB5-BB6 in FIG. 3B can have an ID of "<Addr1>, 1, 0, 0". In another example embodiment, the logic 302 can determine differences or address offsets between target addresses of different basic blocks. The determined address offsets can be used for generating an ID for a program path. For example, the program path BB1-BB3-BB5-BB6 in FIG. 3B can have an ID of "<Addr1>, <Addr3-Addr1>, <Addr4-Addr3>, <Addr5-Addr4>".

Figure 3C:
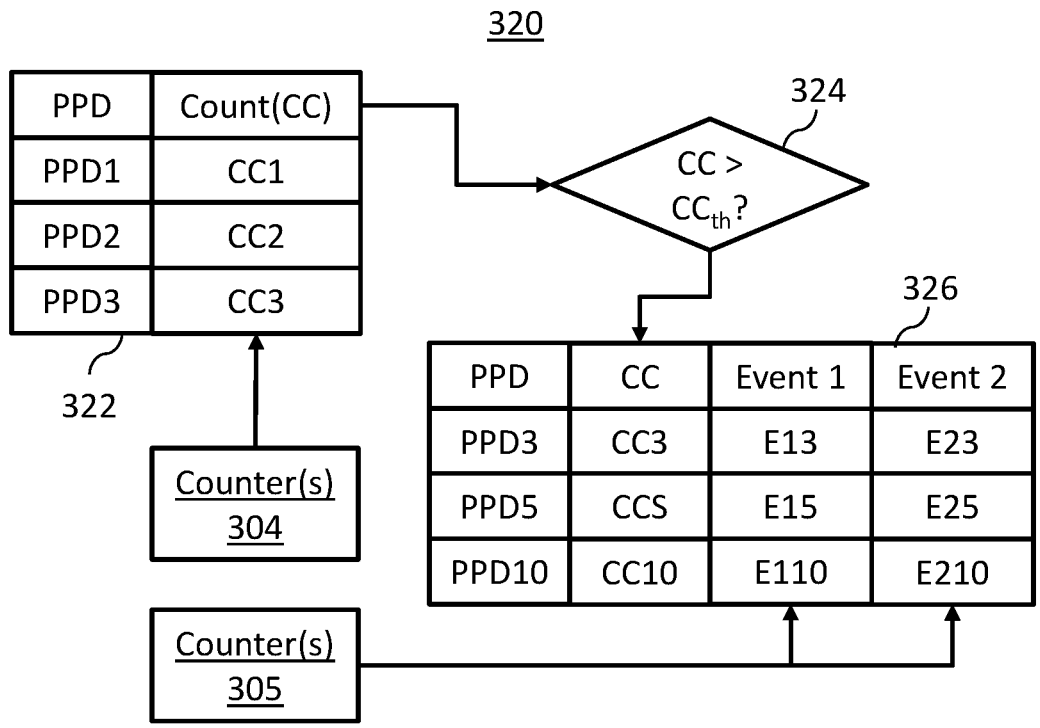
FIG. 3C illustrates a set of tables that can used for the example implementation shown in FIG. 3A in accordance with an embodiment.

In an example shown in FIG. 3C, the block 320 of circuit 230 can be used for tracking committed program paths, or program paths with committed instructions. The circuit 230 can track occurrences of one or more committed program paths using the set of buffers 322. In FIG. 3C, program paths identified by program path descriptors PPD1, PPD2, PPD3 are stored in the set of buffer 322 in the block 320. The logic 302 can implement one or more counters 304 to count occurrences of each committed program path. For example, the logic 302 can track the committed instructions 312 being received by the circuit 230. If the received committed instructions 312 includes a sequence of basic blocks that form the program path PPD1, the counters 304 can increment a counter CC1 to log an occurrence of PPD1. Further, after each increment of a count CC in the buffers 322, the logic 302 can implement a comparator among the circuit elements 324 to compare the incremented count CC with a threshold $CC_{th}$.

In response to a count CC being greater than the threshold $CC_{th}$, the logic 302 can store the associated PPD and count CC in the set of buffers 326 to perform event tracking. In the example of FIG. 3C, PPD3 is stored in the buffers 326, indicating that the count CC3 is greater than the threshold $CC_{th}$. The value of the threshold $CC_{th}$ can be programmable, adjustable, predefined, etc., by a user of the processor 102 or by the circuit 230 based on specific triggers For example, the count CC3 being greater the threshold $CC_{th}$ can indicate that PPD3 occurs relatively frequently, or PPD3 is considered as a hot program path. If the number of buffers 326 is limited, the threshold $CC_{th}$ can be increased (e.g., by a user, or by the circuit 230 autonomously) to limit the number of PPDs that would satisfy the comparison by the comparator in circuit elements 324, effectively reducing the number of committed program paths undergoing event tracking based on the buffers 326. In an embodiment, the logic 302 can be configured to program the threshold $CC_{th}$ based on a capacity of the buffers 326. For example, if 50% of the buffers 326 are filled after a time period, then the logic 302 can decrease the threshold $CC_{th}$ to fill up the buffers 326 with more unique program paths for event tracking. If 90% of the buffers 326 are filled, then the logic 302 can increase the threshold $CC_{th}$ to prevent the buffers 326 from being filled up too quickly. Therefore, a capacity of the buffers 326 can trigger an increase or a decrease in the threshold $CC_{th}$, and this capacity can be, for example, programmable, adjustable, or predefined, etc., by a user of the processor 102 or by the circuit 230.

The circuit 230 can track, for each program path, occurrences of one or more events, such as events labeled as Event 1 and Event 2 in the buffers 326. Example of events that can be tracked by the circuit 230 using buffers 326 can include, but not limited to, power consumption, memory consumption, cache hits (for any level cache), cache misses (for any level cache), number of cycles spent in the program path, etc. The logic 302 can implement one or more counters 305 to track different events for the program paths. Further, the logic 302 can determine scores based on the tracked occurrences of program paths and events. For example, Event 1 can be cache hits and Event 2 can be cache misses. Thus, as illustrated in FIG. 3C, a cache hit score for PPD3 is CC3+E13 and a cache miss score for PPD3 is CC3+E23.

The scores determined by the logic 302 can be used for optimizing the program 300. For example, if the cache hit score of program path PPD3 is significantly higher than the cache miss score of program path PPD3, then one can determine that the program path PPD3 can be retained in the program 300. If the cache hit score of program path PPD3 is significantly lower than the cache miss score of program path PPD3, then one can determine that one or more instructions among the program path PPD3 may need to be modified to reduce or improve the cache miss count. In another embodiment, the scores determined by the logic 302 can be based on, for example, programmable weights. For example, if the program 300 has a relatively high tolerance for cache miss events (Event 2), then the logic 302 can determine the cache miss score of PPD3 as CC3+0.5E23, to reduce a sensitively to the cache miss event. The number of events to be tracked, and the weights for the score determination, can be, for example, programmable depending on a desired implementation of the methods and systems described herein.

Figure 3D:
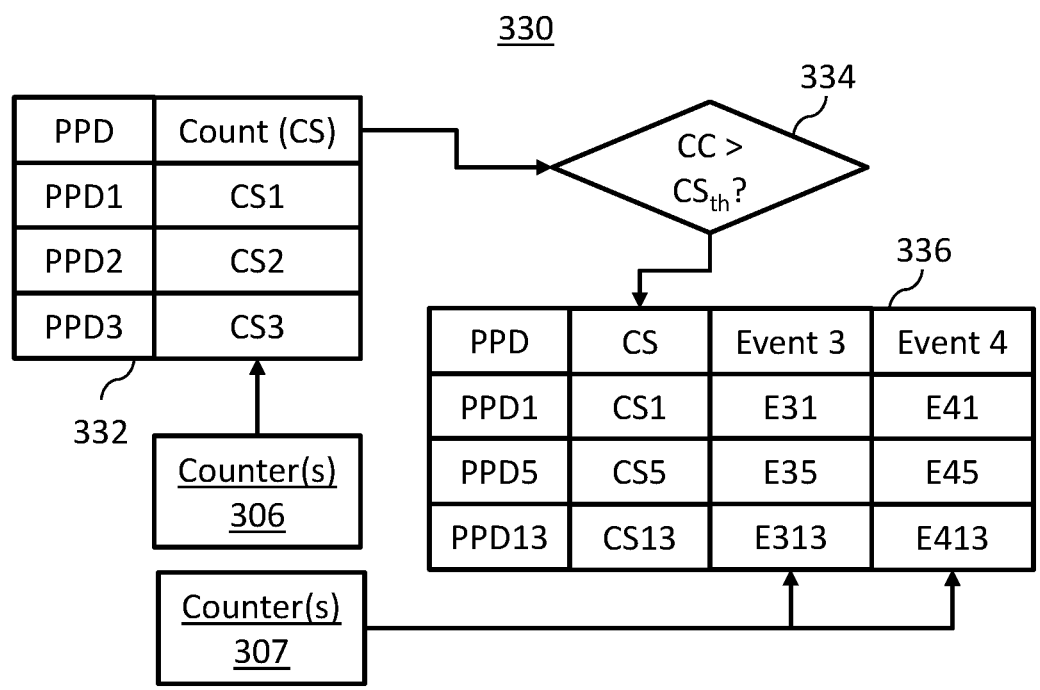
FIG. 3D illustrates another set of tables that can used for the example implementation shown in FIG. 3A in accordance with an embodiment.

In an example shown in FIG. 3D, the block 330 can be used for tracking speculative program paths, or program paths with speculative instructions. The circuit 230 can track occurrences of one or more speculative program paths using the set of buffers 332. In FIG. 3D, all speculative program paths of the program 300, such as speculative program paths identified by program path descriptors PPD1, PPD2, PPD3, are stored in the set of buffers 332 in the block 330. The logic 302 can implement one or more counters 306 to count occurrences of each speculative program path. For example, the logic 302 can track the speculative instructions 310 being received by the circuit 230 from the issue unit 22, such as by counting the number of times each program path is issued from the issue unit 22 to the execution units 24 (e.g., the count CS). If the received speculative instructions 312 includes a sequence of basic blocks that form the program path PPD1, the counters 306 can increment a counter CS1 to log an occurrence of PPD1. Further, after each increment of a count CS in the buffers 332, the logic 302 can implement a comparator among the circuit elements 334 to compare the incremented count CS with a threshold $CS_{th}$.

In response to a count CS being greater than the threshold $CS_{th}$, the logic 302 can store the associated PPD and count CS in the set of buffers 336 to perform event tracking. In the example of FIG. 3D, PPD1 is stored in the buffers 336, indicating that the count CC1 is greater than the threshold $CS_{th}$. The value of the threshold $CS_{th}$ can be, for example, programmable, adjustable, predefined, etc., by a user of the processor 102 or by the circuit 230 based on specific triggers. For example, the count CS1 being greater the threshold $CS_{th}$ can indicate that PPD1 occurs relatively frequently, or PPD1 is considered as a hot speculative program path. If the number of buffers 326 is limited, the threshold $CS_{th}$ can be increased (e.g., by a user, or by the circuit 230 autonomously) to limit the number of PPDs that would satisfy the comparison by the comparator in circuit elements 334, effectively reducing the number of speculative program paths undergoing event tracking based on the buffers 336. In an embodiment, the logic 302 can be configured to program the threshold $CS_{th}$ based on a capacity of the buffers 336. For example, if 50% of the buffers 336 are filled after a time period, then the logic 302 can decrease the threshold $CS_{th}$ to fill up the buffers 336 with more unique speculative program paths for event tracking. If 90% of the buffers 336 are filled, then the logic 302 can increase the threshold $CS_{th}$ to prevent the buffers 336 from being filled up too quickly. Therefore, a capacity of the buffers 336 can trigger an increase or a decrease in the threshold $CS_{th}$, and this capacity can be, for example, programmable, adjustable, or predefined, etc., by a user of the processor 102 or by the circuit 230.

Note that the same PPDs can be stored in the buffers 322 and the buffers 332, but the PPDs stored in the buffers 326 and 336 can be different. If the thresholds $CC_{th}$ and $CS_{th}$ are the same, the different storage status of a PPD can indicate whether the program path identified by the PPD is a correct path or an incorrect path. For example, PPD1 being stored in buffers 336 but not in buffers 326 indicate that PPD1 can be an incorrect path because PPD1 is processed by the execution units 24 less frequently than speculated. This different storage status can be used for determining whether a program path that may be incorrectly speculated needs to be modified of removed from the program 300.

The circuit 230 can track, for each speculative program path, occurrences of one or more events, such as events labeled as Event 3 and Event 4 in the buffers 336. Example of events that can be tracked by the circuit 230 using buffers 336 can include, but not limited to, power consumption, memory consumption, number of cycles spent in the program path, mispredicted branches, etc. Some events, such as power consumption and memory consumption, can be tracked by both buffers 326, 336. The logic 302 can implement one or more counters 307 to track different events for the speculative program paths. Further, the logic 302 can determine scores based on the tracked occurrences of speculative program paths and events. For example, as illustrated in FIG. 3D, Event 3 can be a power consumption event (e.g., power consumption during execution of path exceeds a power threshold), such that a power consumption score for PPD1 is CC3+E31.

The scores determined by the logic 302 can be used for optimizing the program 300. For example, if the power consumption score of program path PPD1 is significantly higher than the power consumption score of program path PPD3, then one can determine that the program path PPD3 can be retained in the program 300 but the program path PPD1 may need to be modified or removed. In another embodiment, the scores determined by the logic 302 can be based on programmable weights. For example, if the program 300 has a relatively high tolerance for power consumption, then the logic 302 can determine the power consumption score of PPD1 as CC1+0.5E31, to reduce a sensitively to the power consumption event. The number of events to be tracked, and the weights for the score determination, can be, for example, programmable, adjustable, predefined, etc., by a user or the circuit 230, depending on a desired implementation of the methods and systems described herein.

Figure 4:
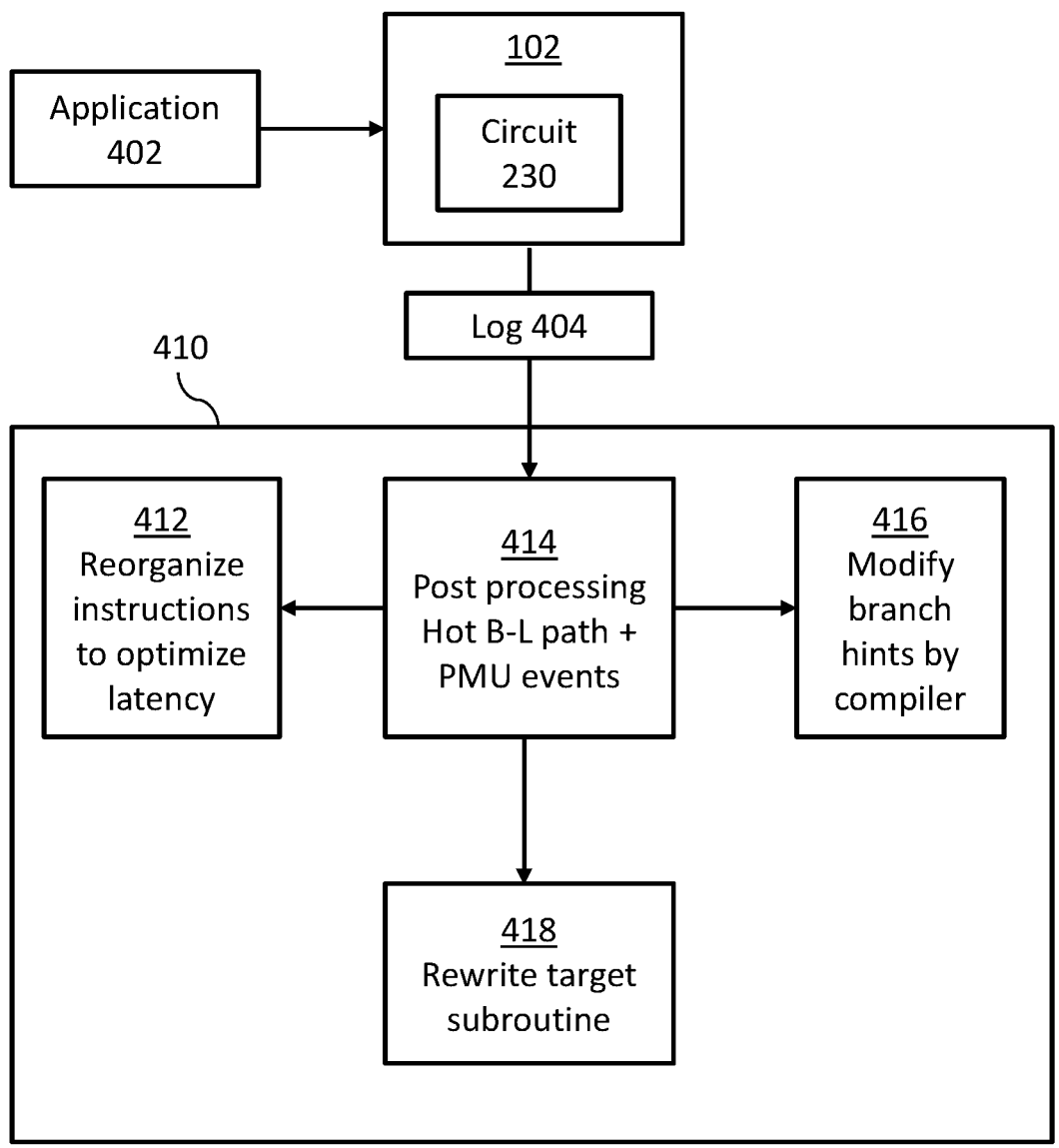
FIG. 4 illustrates example applications of identifying a program path profile for program optimization in an embodiment.

FIG. 4 illustrates example applications of identifying a program path profile for program optimization in an embodiment. In an example shown in FIG. 4, an application 400 having a computer program (e.g., program 300 in FIG. 3A) can be implemented by the processor 102 (see FIG. 2). The circuit 230 (see FIG. 2) can be integrated in the processor 102. The circuit 230 can instrument the computer program of the application 402 to generate a log 404. The log 404 can include information on probe points in all stages of the processor pipeline 210 of the processor 102 (see FIG. 2). The log 404 can also provide relatively fine details of runtime profile of the application 402. In one embodiment, the log 404 can include one or more snapshots of the contents of the buffers 322, 326, 332, 336 in FIG. 3C and FIG. 3D. Data that can be included in the log 404 can indicate analysis results from tracking and monitoring program paths among the application 400, as described above with respect to FIG. 2 to FIG. 3D. For example, the log 404 can include data indicating hot program paths (e.g., program paths that occur frequently), program paths that consume the most and/or least power within a specified time period, program paths that have the most and/or least cache hits and cache misses, correctly and/or incorrectly speculated program paths, program paths with the most or least mispredicted branches, etc. The log 404 can be used for determining whether to perform one or more actions 410 that may optimize the application 402.

In response to the circuit 230 outputting the log 404, a post-processing procedure 414 can be performed to identify specific hot program paths and/or performance monitoring unit (PMU) events in the log 404 that may be of interest to a programmer. For example, a programmer may desire to redesign the application to improve latency and branch mispredictions. The programmer may identify specific program paths in the log 404 that have the highest scores in latency events and branch misprediction events. In an embodiment, upon identifying the specific program paths in the procedure 414, the programmer, at block 412, can reorganize instructions in the program code of the application 402 to optimize latency. In another embodiment, upon identifying the specific program paths in the procedure 414, the programmer, at block 416, can modify branch hints in a compiler to improve branch mispredictions. In another embodiment, upon identifying the specific program paths in the procedure 414, the programmer, at block 418, can rewrite target subroutines in the identify program paths.

Figure 5:
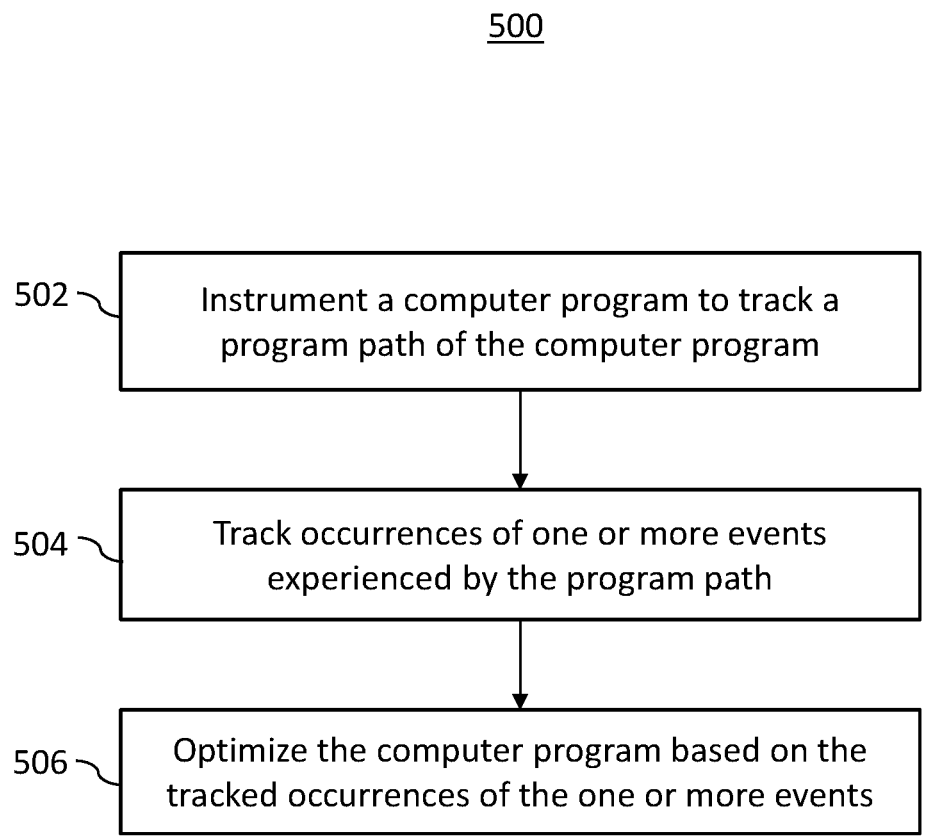
FIG. 5 illustrates an example flowchart of identifying a program path profile for program optimization in an embodiment.

FIG. 5 illustrates an example flowchart of identification of program path profile for program optimization in an embodiment. The process 500 can include one or more operations, actions, or functions as illustrated by one or more of blocks 502, 504, and/or 506. Although illustrated as discrete blocks, various blocks can be divided into additional blocks, combined into fewer blocks, eliminated, performed in different order, or performed in parallel, depending on the desired implementation.

The process 500 can begin at block 502. At block 502, a processor can run an instrumentation tool to instrument a computer program to track a program path of the computer program. The program path can include one or more instruction sequence blocks. Each instruction sequence block can include a sequence of instructions having a single entry point and a single exit point. In one embodiment, each instruction sequence block can terminate with a branch instruction. In one embodiment, the instrumentation tool can identify the program path from a plurality of program paths of the computer program based on a comparison between occurrences of the plurality of program paths with a threshold.

In one embodiment, the program path can include a starting instruction sequence block that starts the program path. The instrumentation tool can identify an address associated with the starting instruction sequence block. The instrumentation tool can further determine, for each subsequent instruction sequence block in the program path, whether the instruction sequence block has taken or not taken a branch that terminated the instruction sequence block. In response to determining the instruction sequence block has taken the branch, the instrumentation tool can assign a first binary value to the instruction sequence block. In response to determining the instruction sequence block has not taken the branch, the instrumentation tool can assign a second binary value to the instruction sequence block. The instrumentation tool can further combine the identified address with the assigned binary values to generate a signature that uniquely identifies the program path.

In one embodiment, each instruction sequence block can be associated with an address. The instrumentation tool can identify an address associated with the starting instruction sequence block. The instrumentation tool can determine, for each subsequent instruction sequence block in the program path, an offset between an address associated with the instruction sequence block and an address associated with a previous instruction sequence block in the program path. The instrumentation tool can combine the identified address with the determined offsets to generate a signature that uniquely identifies the program path.

The process 500 can proceed from block 502 to block 504. At block 504, the instrumentation tool can track occurrences of one or more events experienced by the program path. In one embodiment, the program path can be tracked in a speculative stage prior to an execution of the program path by an execution unit. In another embodiment, the program path can be tracked in a committed stage after an execution of the program path by an execution unit. In an embodiment, the one or more events can include at least one of a group consisting of: power consumption, a memory consumption, a number of cache hits, a number of cache misses, a number of mispredicted branches, latency, and combinations thereof. The process 500 can proceed from block 504 to block 506. At block 506, the processor can optimize the computer program based on the tracked occurrences of the one or more events.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for tracking events in a computer program, the method comprising:
    instrumenting the computer program to track a program path of the computer program, the program path includes one or more instruction sequence blocks, wherein each one of the instruction sequence blocks includes a sequence of instructions, and each instruction except for a terminal instruction among the sequence of instructions has a single entry point and a single exit point, and the terminal instruction has more than one possible outcome;
    determining a first count of occurrences of the program path in a speculative stage is greater than a first threshold;
    in response to the first count being greater than the first threshold, tracking occurrences of a first set of events associated with the program path in the speculative stage;
    determining a second count of occurrences of the program path in a committed stage is greater than a second threshold;
    in response to the second count being greater than the second threshold, tracking occurrences of a second set of events associated with the program path in the committed stage; and
    based on tracking of occurrences of the first set of events and tracking of occurrences of the second set of events, determining whether to retain the program path in the computer program or to modify the program path.

2. The method of claim 1, wherein the terminal instruction is a branch instruction.

3. The method of claim 1, wherein the program path includes a starting instruction sequence block that starts the program path and a plurality of subsequent instruction sequence blocks subsequent to the starting instruction sequence block, and the method further comprising:
    identifying an address associated with the starting instruction sequence block;
    determining, for each one of the plurality of subsequent instruction sequence blocks in the program path, whether the subsequent instruction sequence block has taken or not taken a respective branch that terminated the subsequent instruction sequence block;
    in response to determining the subsequent instruction sequence block has taken the respective branch, assigning a first binary value to the subsequent instruction sequence block;
    in response to determining the subsequent instruction sequence block has not taken the respective branch, assigning a second binary value to the subsequent instruction sequence block; and
    combining the identified address with the assigned first and second binary values to generate a signature that uniquely identifies the program path.

4. The method of claim 1, wherein the program path includes a starting instruction sequence block that starts the program path and a plurality of subsequent instruction sequence blocks subsequent to the starting instruction sequence block, and each one of the one or more instruction sequence blocks is associated with an address, and the method further comprising:
    identifying a starting address associated with the starting instruction sequence block;
    determining, for each one of the plurality of subsequent instruction sequence blocks in the program path, an offset between a first address associated with the starting instruction sequence block and a second address associated with a previous instruction sequence block in the program path;
    combining the identified starting address with the determined offsets to generate a signature that uniquely identifies the program path.

5. The method of claim 1, wherein the first set of events and the second set of events comprise at least one selected from a group consisting of: power consumption, a memory consumption, a number of cache hits, a number of cache miss, a number of mispredicted branches, latency, and combinations thereof.

6. A system comprising:
    a processor including one or more execution units configured to execute instructions of a computer program;
    a circuit coupled to the processor, the circuit being configured to:
        instrument the computer program to track a program path of the computer program, the program path includes one or more instruction sequence blocks, wherein each one of the instruction sequence blocks includes a sequence of instructions, and each instruction except for a terminal instruction among the sequence of instructions has a single entry point and a single exit point, and the terminal instruction has more than one possible outcome;
        determine a first count of occurrences of the program path in a speculative stage is greater than a first threshold;
        in response to the first count being greater than the first threshold, track occurrences of a first set of events associated with the program path in the speculative stage;

determine a second count of occurrences of the program path in a committed stage is greater than a second threshold;

in response to the second count being greater than the second threshold, track occurrences of a second set of events associated with the program path in the committed stage; and based on tracking of occurrences of the first set of events and tracking of occurrences of the second set of events, determine whether to retain the program path in the computer program or to modify the program path.

7. The system of claim 6, wherein the terminal instruction is a branch instruction.

8. The system of claim 6, wherein the program path includes a starting instruction sequence block that starts the program path and a plurality of subsequent instruction sequence blocks subsequent to the starting instruction sequence block, and the circuit is configured to:

identify an address associated with the starting instruction sequence block;

determine, for each one of the plurality of subsequent instruction sequence blocks in the program path, whether the subsequent instruction sequence block has taken or not taken a respective branch that terminated the subsequent instruction sequence block;

in response to determining the subsequent instruction sequence block has taken the respective branch, assign a first binary value to the subsequent instruction sequence block;

in response to determining the subsequent instruction sequence block has not taken the respective branch, assign a second binary value to the subsequent instruction sequence block; and combine the identified address with the assigned first and second binary values to generate a signature that uniquely identifies the program path.

9. The system of claim 6, wherein the program path includes a starting instruction sequence block that starts the program path and a plurality of subsequent instruction sequence blocks subsequent to the starting instruction sequence block, and each one of the one or more instruction sequence blocks is associated with an address, and the circuit is configured to:

identify a starting address associated with the starting instruction sequence block;

determine, for each one of the plurality of subsequent instruction sequence block in the program path, an offset between a first address associated with the starting instruction sequence block and a second address associated with a previous instruction sequence block in the program path;

combine the identified starting address with the determined offsets to generate a signature that uniquely identifies the program path.

10. The system of claim 6, wherein:

the circuit includes:

one or more counters configured to count occurrences of a plurality of program paths of the computer program in the speculative stage and in the committed stage; and one or more comparators configured to compare the occurrences of the plurality of program paths with the first threshold and with the second threshold.

11. The system of claim 6, wherein the circuit includes a counter configured to count the first count of occurrences of the program path in the speculative stage prior to an execution of the program path by the one or more execution units.

12. The system of claim 6, wherein the circuit includes a counter configured to count the second count of occurrences of the program path in the committed stage after an execution of the program path by the one or more execution units.

13. The system of claim 6, wherein the first set of events and the second set of events comprise at least one of a group consisting of: power consumption, a memory consumption, a number of cache hits, a number of cache miss, a number of mispredicted branches, latency, and combinations thereof.

14. A computer program product for tracking events in a computer program, the computer program product comprising a non-transitory computer readable storage medium having program instructions embodied therewith, the program instructions executable by a processing element to:

instrument the computer program to track a program path of the computer program, the program path includes one or more instruction sequence blocks, wherein each one of the instruction sequence blocks includes a sequence of instructions, and each instruction except for a terminal instruction among the sequence of instructions has a single entry point and a single exit point, and the terminal instruction has more than one possible outcome;

determine a first count of occurrences of the program path in a speculative stage is greater than a first threshold;

in response to the first count being greater than the first threshold, track occurrences of a first set of events associated with the program path in the speculative stage;

determine a second count of occurrences of the program path in a committed stage is greater than a second threshold;

in response to the second count being greater than the second threshold, track occurrences of a second set of events associated with the program path in the committed stage; and based on tracking of occurrences of the first set of events and tracking of occurrences of the second set of events, determine whether to retain the program path in the computer program or to modify the program path.

15. The computer program product of claim 14, wherein the program path includes a starting instruction sequence block that starts the program path and a plurality of subsequent instruction sequence blocks subsequent to the starting instruction sequence block, and the program instructions are executable by the processing element to:

identify an address associated with the starting instruction sequence block;

for each one of the plurality of subsequent instruction sequence blocks in the program path:

determine whether the subsequent instruction sequence block has taken a respective branch that terminated the subsequent instruction sequence block, or not taken the respective branch; in response to determining the subsequent instruction sequence block has taken the respective branch, assign a first binary value to the subsequent instruction sequence block;

in response to determining the subsequent instruction sequence block has not taken the respective branch, assign a second binary value to the subsequent instruction sequence block; and determine an offset between a first address associated with the subsequent instruction sequence block and a second address associated with a previous instruction sequence block in the program path;

generate a signature that uniquely identifies the program path by performing one of:

combine the identified address with the assigned first and second binary values to generate a signature that uniquely identifies the program path; and combine the identified address with the determined offsets to generate a signature that uniquely identifies the program path;

optimize the computer program based on the tracked occurrences of the first and second set of events.

16. The method of claim 1, further comprising:

storing the first count in a first buffer;

adjusting the first threshold based on a capacity of the first buffer;

storing the second count in a second buffer; and adjusting the second threshold based on a capacity of the second buffer.

17. The method of claim 1, further comprising:

determining a mismatch between the first count and the second count; and in response to the mismatch between the first count and the second count, determining that the program path needs to be modified.

\* \* \* \* \*